United States Patent [19]

Ross

[11] Patent Number: 4,791,957

[45] Date of Patent: Dec. 20, 1988

[54] STEM REGULATOR

[75] Inventor: Albert Ross, Elyria, Ohio

[73] Assignee: Western/Scott Fetzer Company, Westlake, Ohio

[21] Appl. No.: 26,755

[22] Filed: Mar. 17, 1987

[51] Int. Cl.4 .......................................... F16K 31/122
[52] U.S. Cl. ........................... 137/505.12; 137/505.25
[58] Field of Search .............. 137/614, 614.01, 505.12, 137/505.25, 507

[56] References Cited

U.S. PATENT DOCUMENTS

| | | | |
|---|---|---|---|
| 3,474,816 | 10/1969 | Burgers | 137/596.18 X |
| 3,749,356 | 7/1973 | Conley | 251/149.4 X |
| 3,890,499 | 6/1975 | Moskow | 137/505.25 |
| 3,995,656 | 12/1976 | Mills, Jr. | 137/505.25 X |
| 4,263,939 | 4/1981 | Bird | 137/613 |
| 4,484,695 | 11/1984 | Fallon et al. | 137/505.25 X |

Primary Examiner—A. Michael Chambers
Assistant Examiner—John C. Fox
Attorney, Agent, or Firm—Pearne, Gordon, McCoy & Granger

[57] ABSTRACT

A stem regulator for direct mounting on the valve of a high pressure gas cylinder to provide a reduced delivery pressure for components or circuits of lesser pressure rating. The main body of the regulator, which contains its working parts, is adapted to serve, for example, as an inlet nipple for connecting the cylinder valve to a conventional adjustable pressure regulator. At one end, the body has a cylinder valve coupling face and nut and at the appropriate end has an adaptor threaded to mate with the conventional regulator. A compact design and straight-through flow path of the regulator simplifies installation and ensures durability.

1 Claim, 1 Drawing Sheet

STEM REGULATOR

BACKGROUND OF THE INVENTION

The invention relates to improvements for compressed air systems and, in particular, to pressure regulators for such systems.

Prior Art

In the current state of the art, industrial and commercial compressed gas cylinders are charged to pressures up to 5500 psi. Often, existing user equipment, including pressure regulators, cylinder clusters, and standard manifolds, may not be rated for these relatively high pressures. Furthermore, these high cylinder pressures require proportionately greater pressure reduction to attain usable levels. The inaccuracy of delivery pressure of conventional regulators can be proportional to the level of the maximum pressures to which they are subjected. Consequently, where high pressure capacity cylinders are used, it can be difficult to adequately regulate delivery pressure with general utility pressure regulators.

SUMMARY OF THE INVENTION

The invention provides a pressure regulator unit that is particularly suited for use as the initial stage in compressed gas cylinder circuits. In accordance with the invention, the regulator unit is integrated in a stem or nipple that couples directly with the cylinder valve. The stem forms the main body of the regulator unit and essentially all of its working components are contained within it. The resultant construction is small in size, economical to produce, simple to install, and rugged in service.

Manufacturing costs of the stem regulator unit are reduced by the invention, since its principal parts share multiple functions. The body of the stem, besides providing the appropriate configuration for coupling to the cylinder valve, is internally machined or otherwise formed with a valve seat and a bore for receiving a pressure regulating piston. An adaptor carried on the exit end of the stem has a configuration suitable for mating the stem to other apparatus, such as another regulator, flow meter, or manifold, while at the same time serving to retain the working elements in the stem bore.

The compact construction of the disclosed stem pressure regulator limits overhung loads on the stem and cylinder valve, thereby reducing the risk of damage to these elements when tightening forces are applied to them or components mounted on them. A straight-through flow path geometry of the stem avoids awkward or complex reaction forces in the pieces being joined, so that the risk of overtightening is reduced and gauges or other components may be readily installed and tightened on the stem with their faces in an easily observed, upright position without requiring undue care or high dexterity. The compactness of the stem regulator limits the risk of damage by reducing the bending moments developed on it when forces are inadvertently or carelessly applied to components mounted on it.

A significant advantage of the regulator stem is its ability to extend the life of the valve of a downstream regulator, since the downstream unit need only sustain the reduced pressure delivered by the regulator stem. In the disclosed embodiment, the stem regulator is a non-adjustable, single-stage unit, and is factory-set to reduce cylinder pressure from 5500 psi to a nominal pressure of 2000 psi. A particularly advantageous use of the invention is in retrofitting conventional adjustable pressure regulators of moderate pressure capacity (e.g., maximum inlet pressure of 3000 psi) to newer high pressure cylinders (e.g., 5500 psi). The stem regulator is used to directly couple the adjustable regulator to the cylinder valve in place of a conventional regulator inlet nipple.

DESCRIPTION OF THE PREFERRED EMBODIMENT

Figure 1:
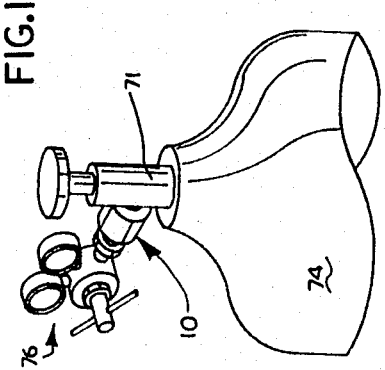
FIG. 1 is a perspective view of a compressed gas cylinder on which is assembled a stem pressure regulator constructed in accordance with the invention.

Referring now to the drawing, there is shown a stem pressure regulator 10 comprising a main body stem or nipple 11, a nut 12, and an adaptor 13. Within the nipple 11, the stem regulator includes a piston 14 and biasing springs 16. The nipple 11, nut 12, adaptor 13, and piston 14 are preferably machined of brass or other suitable material.

The nipple 11 is an elongated, circular body having a longitudinal axis, indicated at 17, having a length in the order of two and one-half times its maximum diameter. Externally, the nipple 11 includes a rounded, convex nose 18 at an inlet end 19, a shoulder 21 which can have a hexagonal, external cross section when viewed axially, and a generally cylindrical extension 22. The shoulder 21 forms the major transverse dimension or diameter of the nipple 11. The shoulder 21 includes a generally radial surface 23 facing in a direction opposite the nose 18 and adapted to abut an internal radial face 24 of the nut 12. An outlet end of the extension 22, remote from the inlet end 19, is externally threaded at 26.

A generally circular passage 27 of varying diameter extends axially through the nipple 11. Adjacent the inlet end 19, the passage 27 includes a counterbore 28, a conical section 29, and a cylindrical bore 31. A filter 32 of porous metal, as shown, or of fine mesh metal screen is assembled with a tight fit in the bores 28,29 and, if desired, may be retained therein by suitable staking of local areas of the wall of the nipple 11 at the entrance of the counterbore 28. A small bore 33 joins the filter bore 31 to a cylindrical piston bore 34. An end of the piston bore 34 is trepanned to leave a projecting annular valve seat 36 concentric with the longitudinal axis 17 and surrounding the junction of the bores 33 and 34. At its outlet end, the nipple 11 is formed with a cylindrical piston counterbore 37. The piston 14 is stepped in its outside diameter and includes a stem portion 39 and a head portion 41. The stem and head portions 39,41 are assembled respectively in the piston bores 34, 37 with a sliding fit.

An upstream end face 46 of the piston stem 39 has an elastomeric seat 42 of high density Teflon or other suitable material in the shape of a short, cylindrical plug, friction fit or otherwise retained in a complementarily shaped cylindrical recess 43. A section 44 of the stem portion 39 extending from the seat end face 46 has a diameter somewhat smaller than the surrounding piston bore 34 so that a clearance 47 exists to permit fluid flow therebetween. A transverse hole 48 in the reduced diameter section 44 connects the clearance 47 to a central bore 49 opening through a radial end face 51 of the piston head 41. Elastomeric O-rings 52, 53 in respective grooves in the piston 14 seal against the bores 34, 37. A series of washerlike disc springs 16 of spring steel are spindles on the piston stem 39 and are constrained by opposing radial faces 56, 57 of the counterbore 37 and piston head 41. The space of the bore 37 occupied by the springs 16 is vented by a drilled passage 58.

Internal threads 59 of the nut 12 are proportioned to fit over the shoulder 21. The exterior of the nut 12 preferably has a hexagonal cross section when viewed axially. A cylindrical aperture 61 in a radial shoulder or wall 60 of the nut 12 provides a loose sliding fit on the cylindrical extension 22 of the nipple 11.

Preferably, a large end 62 of the adaptor 13 has a hexagonal exterior cross section when viewed axially and internal threads 63 complementary to the nipple threads 26. Adjacent its other end, the adaptor 13 has external threads 64 suitable for coupling with a component of a compressed gas circuit, such as a pressure regulator or a manifold. The adaptor 13 has a varying diameter axial bore 66 for passage of fluid through it. The adaptor 13 is threaded tightly onto the nipple threads 26 to retain the piston 14 in the stem bores 34, 37. With the adaptor 13 in place on the nipple threads 26, the piston 14 and springs 16 are retained in the nipple bore 37 by interference with the adaptor wall forming an adjacent area of the bore 66. The adaptor 13 also serves to retian the nut 12 on the nipple, since it has a major diameter or transverse dimension larger than the nut aperture 61. A washerlike gasket 67 is compressed between an internal radial face 68 in the adaptor 13 and an opposing radial end face 69 on the nipple 11 to make a leakproof joint between these elements.

A compressed gas cylinder 74 and associated valve 71 are shown in FIG. 1. The stem regulator 10 is releasably coupled to a port 75 of the cylinder valve 71 by the nut 12, its internal threads 59 being tightened on mating threads 72 of the valve 71 until forces between the stem and nut shoulders 21 and 60 hold the nipple nose 18 in fluidtight compression against a conical interior surface of the valve port 75.

In operation, the springs 16 keep the piston seat 42 out of contact with the annular valve seat 36 until a certain pressure exists in the adaptor bore 66, at which time the seats are closed by mutual contact. At this point, a differential force exists to overcome that of the springs 16 by virtue of the larger end face 51 of the piston head 41, as compared to the smaller area of the stem portion 39 with the O-rings 52. The valve seats 42, 36 will open when the pressure force, on the area circumscribed by their contact, exceeds the pressure force on the piston face 51. It will thus be understood that calibration of the springs 16 and sizes of the piston areas 51,39 and valve seat 36 determine the pressure reduction afforded by the stem pressure regulator.

The illustrated embodiment shows a nonadjustable, single-stage stem regulator configuration for use in 5500 psi compressed gas systems. The springs 16 and various other components are dimensioned to produce a pressure reduction to, nominally, 2000 psi. The delivery pressure at the adaptor bore 66 is not exactly constant but, rather, depends to a limited degree on cylinder pressure. When connected to high pressure, e.g., 5500 psi, the stem pressure regulator reduces its pressure at the bore 66 to approximately 2200 psi. At a cylinder pressure of 4500 psi, the delivery pressure of the regulator 10 is approximately 2000 psi and at an appproximate cylinder pressure of 1500 psi, the regulator ceases to significantly reduce pressure.

Figure 2:
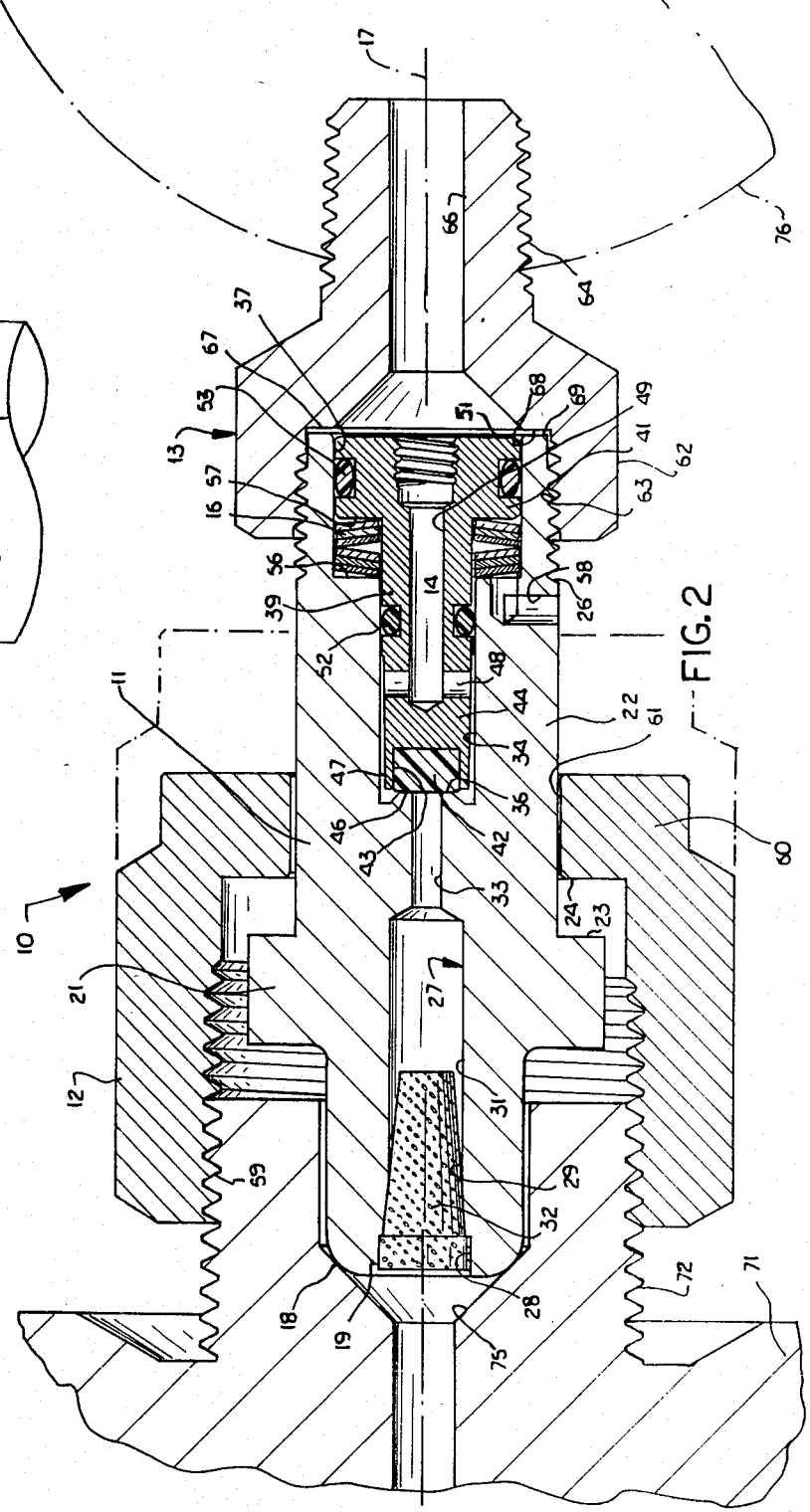
FIG. 2 is a cross-sectional view of the stem regulator, taken in a plane along a longitudinal axis.

A conventional adjustable regulator 76 of moderate pressure capacity (e.g., 3000 psi inlet pressure) can be mounted directly on the adaptor 13. In the illustrated case, the regulator 76 has female threads matching the male threads 64 of the adaptor 13. Alternatively, the adaptor 13 can be connected directly to a manifold system of moderate pressure rating, e.g., 3000 psi, and a pressure tank of 5500 psi can be used. The compact nature of the stem regulator 10 is demonstrated by the existence of the stem valve seat 36 in the axial zone of the cylindrical extension 22 on which the nut aperture 61 spins when being threaded onto the cylinder valve 71. The phantom position of the nut 12 in FIG. 2 corresponds to the point of initial engagement of the nut threads 59 with threads 72 of the cylinder valve 71.

The invention offers a degree of economy because at least two of its principal components, the nipple 11 and nut 12, are typically required to couple the cylinder valve of a compressed gas cylinder and a specific regulator, since the ports on the outlet valve and a regulator can be incompatible. In such instances, the cost of the stem regulator 10 is offset to a measurable extent by the savings in cost of a conventional nipple and nut. The nipple 11, nut 12, and adaptor 13, as well as the internal components, provide a straight line delivery path from the inlet 19 as well as coaxial threaded coupling surfaces 59,64.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In combination, a stem pressure regulator and a second pressure regulator mounted on said stem regulator, the stem regulator including an inlet nipple having an inlet and an outlet and a central passage for conducting gases from the inlet to the outlet, an annular seat surrounding said central passage at a plane transverse to the passage, piston means slidably disposed in the nipple, the piston means having at a first end a seat area adapted to seal the annular seat, and at an opposite end having a face substantially larger than said annular seat, resilient spring means in said nipple urging said piston means away from said annular seat, second passage means for conducting fluid passing through said annular seat to said face, the piston means being arranged in a manner wherein the force of gas pressure on said face opposes the force of the spring means and closes said piston seat area against said annular seat when gas pressure on said face exceeds the gas pressure at the nipple inlet by a predetermined value, the nipple having a convex nose at its inlet end, a generally circular exterior downstream of said nose and a shoulder between said nose and circular exterior extending radially beyond said circular exterior, a coupling nut assembled over said circular exterior, said nut having threads for coupling with a cylinder valve and a shoulder engageable with said nipple shoulder, the pitch diameter of the nut threads being greater than the diametral extent of the nipple shoulder, tightening of said nut thread on said cylinder valve causing abutment of said shoulders and sealing engagement of said nose with the cylinder valve, threaded coupling means on an outlet end of said nipple, said second regulator being mounted to said nipple by said threaded coupling means, the coupling means being of sufficient strength to support said second regulator on the stem regulator in normal service and the nut including the threads thereof being of sufficient strength to support both said stem regulator and said second regulator on the cylinder valve in normal service whereby the stem regulator serves to couple the second regulator to the cylinder valve while beint adapted to improve the accuracy of control of the second regulator and extend the service life of the second regulator by reducing the pressure levels to which the second regulator is exposed.

* * * * *